US007977391B2

(12) United States Patent
Gaemers

(10) Patent No.: US 7,977,391 B2
(45) Date of Patent: Jul. 12, 2011

(54) PROCESS FOR PRODUCING CONDENSED-PHASE PRODUCT FROM ONE OR MORE GAS-PHASE REACTANTS

(75) Inventor: Sander Gaemers, Skirlaugh (GB)

(73) Assignee: BP Exploration Operating Company Limited, MIddlesex (GB)

(*) Notice: Subject to any disclaimer, the term of this patent is extended or adjusted under 35 U.S.C. 154(b) by 352 days.

(21) Appl. No.: 12/086,427

(22) PCT Filed: Nov. 22, 2006

(86) PCT No.: PCT/GB2006/004359
§ 371 (c)(1),
(2), (4) Date: Jun. 12, 2008

(87) PCT Pub. No.: WO2007/071903
PCT Pub. Date: Jun. 28, 2007

(65) Prior Publication Data
US 2009/0272673 A1    Nov. 5, 2009

(30) Foreign Application Priority Data
Dec. 19, 2005 (EP) .................................. 05257795

(51) Int. Cl.
*C07C 1/04* (2006.01)
(52) U.S. Cl. ........................................ 518/706; 585/733
(58) Field of Classification Search .................. 518/706; 585/733
See application file for complete search history.

(56) References Cited

U.S. PATENT DOCUMENTS
2,779,777 A * 1/1957 Mungen ..................... 518/706

FOREIGN PATENT DOCUMENTS
| DE | 29 29 300 | 1/1981 |
| EP | 0 261 870 | 3/1988 |
| EP | 1 033 167 A2 | 9/2000 |
| GB | 2 040 432 A | 8/1980 |
| GB | 2 132 111 | 7/1984 |
| JP | 61 054 229 | 3/1986 |
| WO | WO 2004/056463 A1 | 7/2004 |

OTHER PUBLICATIONS
International Search Report for PCT/GB2006/004359 mailed Feb. 21, 2007.
Written Opinion for PCT/GB2006/004359 mailed Feb. 21, 2007.
International Preliminary Report on Patentability mailed Apr. 1, 2008.

* cited by examiner

*Primary Examiner* — Glenn Caldarola
*Assistant Examiner* — Randy Boyer
(74) *Attorney, Agent, or Firm* — Nixon & Vanderhye

(57) ABSTRACT

Process for the production of a condensed-phase product from one or more gas-phase reactants, by feeding one or more reactants into a reactor, in which reactor the one or more reactants react in the gas-phase in the presence of a solid catalyst having one or more catalyst components to produce at least one product which is in a condensed-phase under reaction conditions. The solid catalyst is present as a bed having two or more regions in which the contact time of the one or more gas-phase reactants with the one or more catalyst components is different.

12 Claims, 3 Drawing Sheets

US 7,977,391 B2

PROCESS FOR PRODUCING CONDENSED-PHASE PRODUCT FROM ONE OR MORE GAS-PHASE REACTANTS

This application is the U.S. national phase of International Application No. PCT/GB2006/004359 filed 22 Nov. 2006 which designated the U.S. and claims priority to European Patent Application No. 05257795.4 filed 19 Dec. 2005, the entire contents of each of which are hereby incorporated by reference.

This invention relates to the field of heterogeneous catalysis, more specifically to an improved process for converting one or more gas-phase reactants into a condensed-phase product in the presence of a solid catalyst.

BACKGROUND OF THE INVENTION

Fischer-Tropsch synthesis is a known reaction for the production of hydrocarbons from syngas (a mixture of carbon monoxide and hydrogen), wherein syngas is contacted with a heterogeneous catalyst to produce a mixture of hydrocarbons. Syngas is typically produced by processes such as steam reforming of coal or natural gas, or from the partial oxidation of natural gas, and it may also be produced from biomass. One application of Fischer-Tropsch synthesis is in the production of hydrocarbon liquids and/or waxes that may be used as fuels or in the production of fuels through processes such as hydrocracking.

During heterogeneously catalysed processes for Fischer-Tropsch synthesis of hydrocarbons, product hydrocarbons that are liquid or solid under reaction conditions can condense on the catalyst surface, which inhibits contact of the syngas reactant with the catalyst surface and results in reduced conversion of reactants.

Variable diameter reactors have hitherto been described for controlling reaction temperatures in processes involving reactants and products that are in the gas-phase under reaction conditions. Thus, WO 03/011449 describes an apparatus in which the cross-sectional area of a solid catalyst bed is increased along its longitudinal axis by use of shaped inserts carrying heat transfer material, and DE 2 929 300 describes a variable diameter reactor for controlling the temperature of catalyst in endothermic or exothermic reactions in which the shape of inserts carrying heat-transfer material is varied along their length. However, the processes described therein do not produce products that are in a condensed-phase under reaction conditions, and hence do not address the issue of coverage of the solid catalyst with condensed-phase product.

SUMMARY OF THE INVENTION

According to the present invention, there is provided a process for the production of a condensed-phase product from one or more gas-phase reactants, which process comprises feeding one or more reactants into a reactor, in which reactor the one or more reactants react in the gas-phase in the presence of a solid catalyst having one or more catalyst components to produce at least one condensed-phase product, characterised in that the solid catalyst has two or more regions in which the contact time of the one or more gas-phase reactants with the one or more catalyst components is different.

In the present invention, the contact time of the one or more gas-phase reactants with the one or more catalyst components of the solid catalyst is different within two or more regions of the solid catalyst. By having different contact times within each region, the conversions of the one or more gas-phase reactants into condensed-phase product can be optimised by maintaining the ratio of the at least one condensed-phase product to the one or more catalyst components (henceforth termed the condensed-phase product to catalyst component ratio) in each region to within a pre-determined range of values.

The predetermined range of values for the condensed-phase product to catalyst component ratio may be based, for example, on results from experimental observations or on theoretical models. The range will typically be selected so as to optimise the efficiency of the process, for example by maintaining low condensed-phase product to catalyst component ratios in regions where there is low reactant conversion, or by maintaining high product to catalyst component ratios where reduced conversions are required. The range of values for the ratio will depend on the variability of the condensed-phase product concentration within each region of the catalyst.

For example, in regions of the solid catalyst in which the quantity of condensed-phase product is high, then the coverage of catalyst by the at least one condensed-phase product will be also be high resulting in low reactant conversions. The reactant conversions can therefore be improved by increasing the contact time between the one or more gas-phase reactants with the one or more catalyst components within that region of the solid catalyst. Conversely, in regions of the solid catalyst in which there is a low quantity of condensed-phase product, the condensed-phase product to catalyst component ratio will be low, hence the catalyst coverage will be low, and the conversions can be high. Therefore, by reducing the contact time, reduced conversions can be achieved.

In preferred embodiments of the present invention, the contact time of the one or more gas-phase reactants with the one or more catalyst components in each region of the solid catalyst may be varied by having regions of the solid catalyst with different concentrations of catalyst components and/or regions of the solid catalyst with different cross-sectional area and volume.

Thus, in one embodiment of the invention, the solid catalyst comprises regions having different concentrations of the one or more catalyst components. The cross-sectional area and/or the volume of the solid catalyst may be the same in different regions of the solid catalyst in order to achieve a different contact time between the one or more gas-phase reactants with the one or more catalyst components therein. Thus, a solid catalyst having two or more regions of the same cross-sectional area and volume, but with a different concentration of the one or more catalyst components, will have a different contact time of the one or more gas-phase reactants with the one or more catalyst components. Thus, a solid catalyst having two or more regions with different concentrations of the one or more catalyst components may be used to maintain independently the ratio of the at least one condensed-phase product to the one or more catalyst components in each region to within a pre-determined range of values.

Additionally, or alternatively, two or more regions of the solid catalyst have a different cross-sectional area and volume which results in a different space velocity of the gas-phase reactants within the different regions of the solid catalyst. The concentration of the one or more catalyst components within each region of the solid catalyst may be the same or different, such that the contact time of the one or more gas-phase reactants with the one or more catalyst components in the two or more regions of the solid catalyst is different. Preferably, the concentration of the one or more catalyst components within each region of the solid catalyst is uniform throughout the solid catalyst, which can reduce the complexity of the loading of the catalyst into a reactor.

By having increased cross-sectional area and volume of solid catalyst in regions where reactant conversions are low, the condensed-phase product to catalyst component ratio is consequently decreased, resulting in decreased catalyst coverage and improved reactant conversions. Conversely, by having a reduced cross-sectional area and volume, an increased coverage of the one or more catalyst components by condensed-phase product can be achieved, which can reduce reactant conversions in that region. This latter case may be advantageous, for example, for exothermic reactions where the extent of exotherm within a region of the solid catalyst is preferably reduced in order to avoid damage to or deactivation of the catalyst. By such means, a solid catalyst having two or more regions of different cross-sectional area and volume may be used to maintain independently the ratio of the at least one condensed-phase product to the one or more gas-phase reactants in each region to within a predetermined range of values.

A further advantage of this embodiment of the present invention is that the solid catalyst can be distributed within a reactor so that higher volumes of catalyst can be present in regions where reduced ratios of the at least one condensed-phase product to the one or more catalyst components are desired, and lower volumes of catalyst can be present in regions where higher ratios are required, which improves utilisation of the solid catalyst. The cross-sectional area of the solid catalyst may vary continuously between the regions of different cross-sectional area and volume, or alternatively may vary in a discrete, stepped way, such that each region of the catalyst bed is defined by a distinct step change in cross-sectional area.

The solid catalyst may comprise, for example, a shaped insert, such as a monolith, a bed of fibrous materials or mesh, or a bed of solid particles such as spheres, beads, granules or extrudates. Preferably, the solid catalyst comprises packed catalyst particles, as the particles can readily be inserted into the reactor so that they adapt to the variations in diameter therein.

The solid catalyst comprises one or more catalyst components which catalyse the conversion of the one or more gas-phase reactants to at least one condensed-phase product. There may be a single catalyst component, for example a transition metal or transition metal compound, or there may be more than one catalyst component, such as additional co-catalysts or catalyst promoters. The one or more catalyst components may be supported or unsupported.

The concentration of the one or more catalyst components within a region of solid catalyst may be varied, for example, by mixing catalytically inert particles with particles comprising the one or more catalyst components. Alternatively or additionally, where the one or more catalyst components are on a support, then different regions of the solid catalyst may comprise regions having different loadings of the one or more catalyst components on the support.

The reactor may comprise one or more inserts. In a preferred embodiment of the invention, the reactor comprises one or more longitudinally disposed inserts having two or more regions with variable cross-sectional area and volume. The solid catalyst may either be within the one or more inserts, or in the reactor space between the one or more inserts and the inner walls of the reactor. Depending on where the catalyst is situated, either the inserts or the catalyst-free region between the inserts and the inner walls of the reactor may be used to carry a heat-exchange medium in order to control the temperature within the reactor. The heat-exchange medium can flow either co-currently in relation to the flow of the one or more gaseous reactants, or counter to the flow of the one or more gaseous reactants.

During the course of the reaction, one or more products are formed, at least one of which is in the condensed-phase under the reaction conditions. The invention is particularly suited for processes in which the products are liquid-phase under the reaction conditions, as liquid products are more easily separated from a solid catalyst compared to wax-like products or other solid products.

In one embodiment of the present invention, two gas-phase reactants are co-currently fed into a reactor, and are passed over a fixed catalyst bed having a uniform concentration of catalyst components, wherein the gas-phase reactants react to produce a liquid-phase product. At the initial point of contact of the two gas-phase reactants with the solid catalyst bed, the concentration of liquid-phase product is low. The concentration of the liquid-phase product increases as the reaction proceeds, and becomes more concentrated as the gas-phase reactants pass along the solid catalyst bed. This can cause a greater extent of coverage of the solid catalyst by liquid-phase product in downstream regions of the solid catalyst, in relation to the direction of flow of gas-phase reactants. By having an increased cross-sectional area and volume of the solid catalyst in downstream regions, the ratio of liquid product to the one or more catalyst components is reduced, leading to less coverage of the catalyst and also an increased contact time of the gas-phase reactants with the solid catalyst within those regions. The result is an improvement in reactant conversions in the regions of higher cross-sectional area and volume.

In an alternative embodiment of the invention, the cross sectional area and volume of the solid catalyst is reduced in a region adjacent to the initial point of contact with the one or more gas-phase reactants. This embodiment could be advantageous, for example, in reactions where there is a delay between initial contact of the one or more reactants with the solid catalyst and the onset of an exothermic reaction Thus, initially, it is advantageous to have a slow flow rate of reactants over the solid catalyst in order to increase the contact time of reactants with the one or more catalyst components, and to promote initiation of the reaction. Once the reaction has initiated, and the rate of reaction increases, the heat generated by the exotherm can potentially cause damage or deactivation of the catalyst, and can result in reduced selectivity to desired product and reduced catalyst lifetime. Therefore, by reducing the cross-sectional area and volume of an adjacent downstream region of the solid catalyst, the flow rate of reactants over the catalyst is increased, which reduces the contact time of the reactants with the solid catalyst, which can result in reduced reactant conversions and reaction rate. Additionally, by reducing the cross-sectional area and volume, the ratio of condensed-phase product to the one or more catalyst components can be increased, which further acts to reduce the conversion of the one or more gas-phase reactants. Optionally, regions of the solid catalyst further downstream may have an increased cross-sectional area and volume in order to improve conversions where increased coverage of the solid catalyst by the liquid product could otherwise occur. Alternatively, regions of the solid catalyst further downstream may have an even lower cross-sectional area and volume.

The solid catalyst may comprise gaps, or portions that are free of catalyst. For example, in embodiments of the invention in which the solid catalyst comprises particles, and the different regions of the solid catalyst have different concentrations of catalyst component(s), the different catalyst regions may be separated by grids in order to prevent cross-mixing of the particles in the different regions. In such embodiments, the volume between the grids may not be completely filled with catalyst and inert particles, for example as a result of settling of the particles.

Where there is more than one gaseous reactant, the reactants may be fed into the reactor either separately or premixed. They may initially all contact the solid catalyst at the same portion of the solid catalyst, or they may be added at different positions of the solid catalyst. The initial point of contact of the one or more reactants with the solid catalyst is the point at which all the reactants initially contact each other in the gas-phase and in the presence of the solid catalyst. Preferably, the one or more gaseous reactants flow co-currently over the solid catalyst.

The one or more gas-phase reactants may be fed into the reactor in the gas-phase, or alternatively as a condensed phase which vapourises within the reactor so that it contacts the solid catalyst in the gas-phase.

The process of the present invention may optionally comprise a plurality of reactors arranged in series, such that any composition removed from the first reactor is fed to a second reactor, and composition removed from the second reactor is fed to a third reactor and so on. In this embodiment, the composition removed from each reactor comprises condensed-phase product and unreacted reactants. Optionally, at least some of the condensed-phase product is removed at a point between the reactors and fed, for example, to a purification section. In such an embodiment, each reactor comprises solid catalyst, and at least the first reactor will have solid catalyst with two or more regions in which the contact time of the one or more gas-phase reactants with the one or more catalyst components is different, as hitherto described.

The one or more product-containing streams removed from the one or more reactors are typically fed to a purification zone, wherein unreacted reactants and undesirable by-products are removed and optionally recycled to the reactor, or any one or more of the reactors.

The present invention is suitable for use in the heterogeneously catalysed production of hydrocarbons from syngas by Fischer-Tropsch synthesis, for example in the production of a diesel or aviation fuel or precursor thereof. Fischer-Tropsch synthesis of hydrocarbons from syngas may be represented by equation 1:

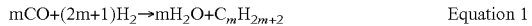

$$mCO+(2m+1)H_2 \rightarrow mH_2O+C_mH_{2m+2}$$ Equation 1

The process will typically result in a product comprising hydrocarbons with a range of carbon numbers, which will depend, inter alia, on the CO:H$_2$ ratio of the syngas, the processing conditions and on the catalyst. The hydrocarbons or mixtures thereof are preferably liquid under the reaction conditions. Preferably, the hydrocarbon number is predominantly in the range where the value "m" from equation 1 is greater than 5.

The volume ratio of hydrogen to carbon monoxide (H$_2$:CO) in the syngas reactant is preferably in the range of from 0.5:1 to 5:1, more preferably from 1:1 to 3:1, and most preferably 1.8:1 to 2.2:1. The one or more gaseous reactants may also comprise other gaseous components, such as nitrogen, carbon dioxide, water, methane and other saturated and/or unsaturated light hydrocarbons, each preferably being present at a concentration of less than 30% by volume.

The temperature of the Fischer-Tropsch reaction is preferably in the range from 100 to 400° C., more preferably from 150 to 350° C., and most preferably from 150 to 250° C. The pressure is preferably in the range from 1 to 100 bar (from 0.1 top 10 MPa), more preferably from 5 to 75 bar (from 0.5 to 7.5 MPa), and most preferably from 10 to 40 bar (from 1.0 to 4.0 MPa).

The one or more gaseous reactants may also comprise recycled materials extracted from elsewhere in the process, such as unreacted reactants separated from the hydrocarbon product during purification.

The syngas is typically passed over the catalyst bed at a gas hourly space velocity (GHSV) in the range from 100 to 10000 h$^{-1}$ (gas volumes converted to standard temperature and pressure), preferably from 250 to 5000 h$^{-1}$, such as from 250 to 3000 h$^{-1}$ and more preferably from 250 to 2000 h$^{-1}$.

The catalyst is typically a particulate fixed-bed catalyst, and comprises a metal active for Fischer-Tropsch catalysis. Preferred metals are selected from one or more of cobalt, iron, ruthenium, nickel, molybdenum, tungsten, and rhenium, preferably cobalt and/or iron, even more preferably cobalt. Preferably, the metal is supported, for example on a support comprising one or more of silica, alumina, silica/alumina, titania, zirconia, ceria or zinc oxide. Preferably, the support is alumina and/or zinc oxide, more preferably zinc oxide. Most preferably, the catalyst comprises cobalt on a zinc oxide support. Catalyst compositions suitable for Fischer-Tropsch processes, and in the present invention, are described, for example, in EP-A-0 261 870 and EP-A-0 209 980.

BRIEF DESCRIPTION OF THE DRAWINGS

The invention will now be illustrated with reference to the Figures, in which.

DETAILED DESCRIPTION OF PREFERRED EMBODIMENTS

Figure 1:
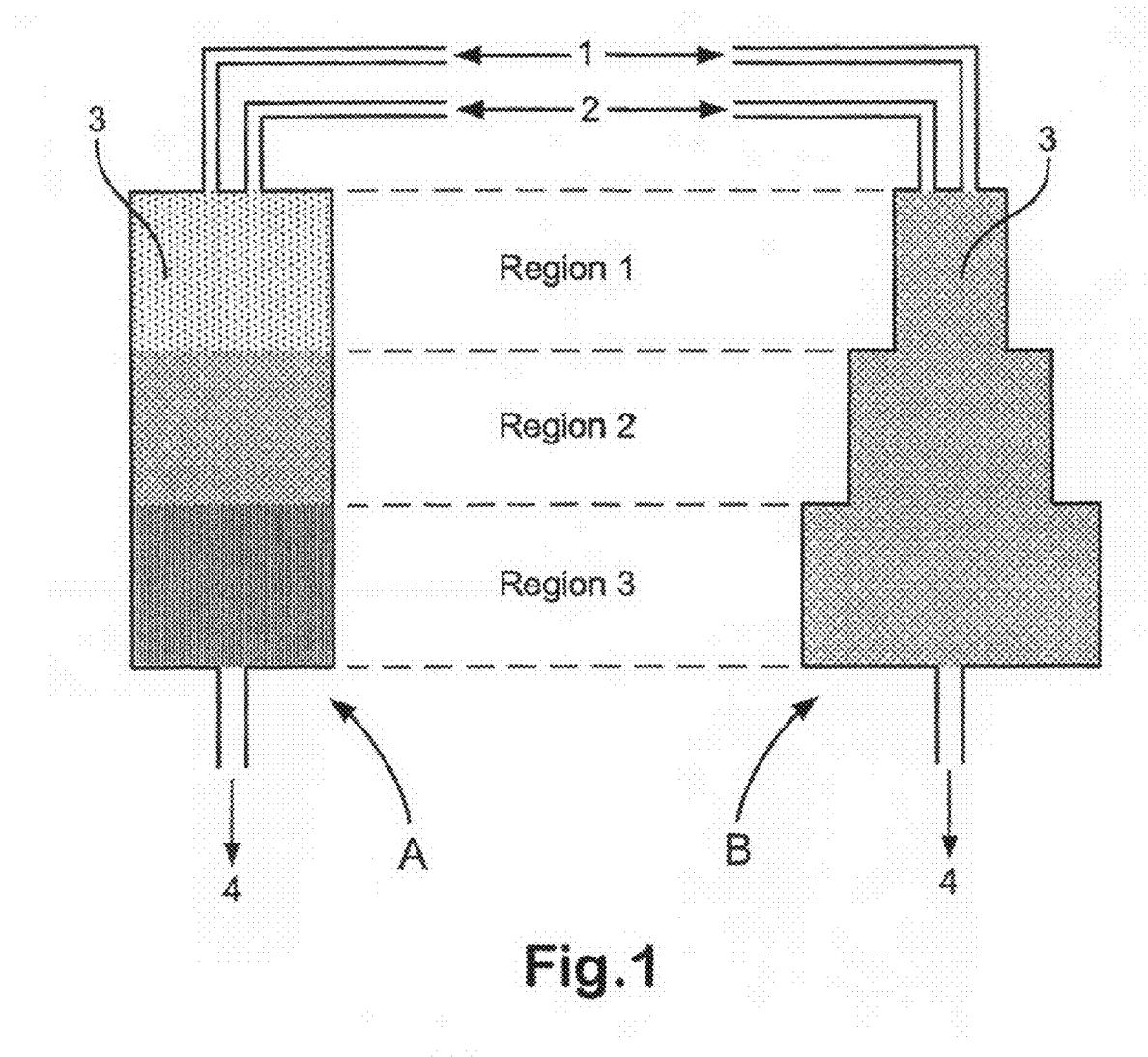
FIG. 1 is a schematic representation of longitudinal sections of two reactors highlighting the concentration of condensed-phase product in three different regions of two different reactors containing the same solid catalyst.

FIG. 1 illustrates the difference in the concentration of a condensed-phase product in three regions of a reactor A with a solid catalyst having regions of constant cross-sectional area and volume, and uniform concentration of the one or more catalyst components, and a reactor B with solid catalyst having the same solid catalyst, but with regions of different cross-sectional area and volume. The solid catalyst of reactor A is therefore not in accordance with the present invention, while that of reactor B is in accordance with the present invention. Two reactants 1 and 2 are co-currently and downwardly fed into each reactor, and react in the gas-phase in the presence of the solid catalyst (not shown) to produce condensed-phase product 4. The concentration of the condensed-phase product 3 within the reactor is represented by the degree of shading, wherein light shading represents a low concentration of condensed-phase product and heavy shading represents a high concentration of condensed-phase product. In reactor A, the volume of each region of the solid catalyst is the same. As the product concentration increases from Region 1 to Region 3, the result is an increasing ratio of condensed-phase product to one or more catalyst components in the respective regions. In reactor B, the ratio is maintained constant in all three regions of the solid catalyst by increasing the cross-sectional area and volume in consecutive regions. Thus, reactant conversions in the three regions of solid catalyst in reactor B are optimised by reducing the extent of coverage of the catalyst by the condensed-phase product by reducing the ratio of condensed-phase product to the one or more catalyst components.

Figure 2:
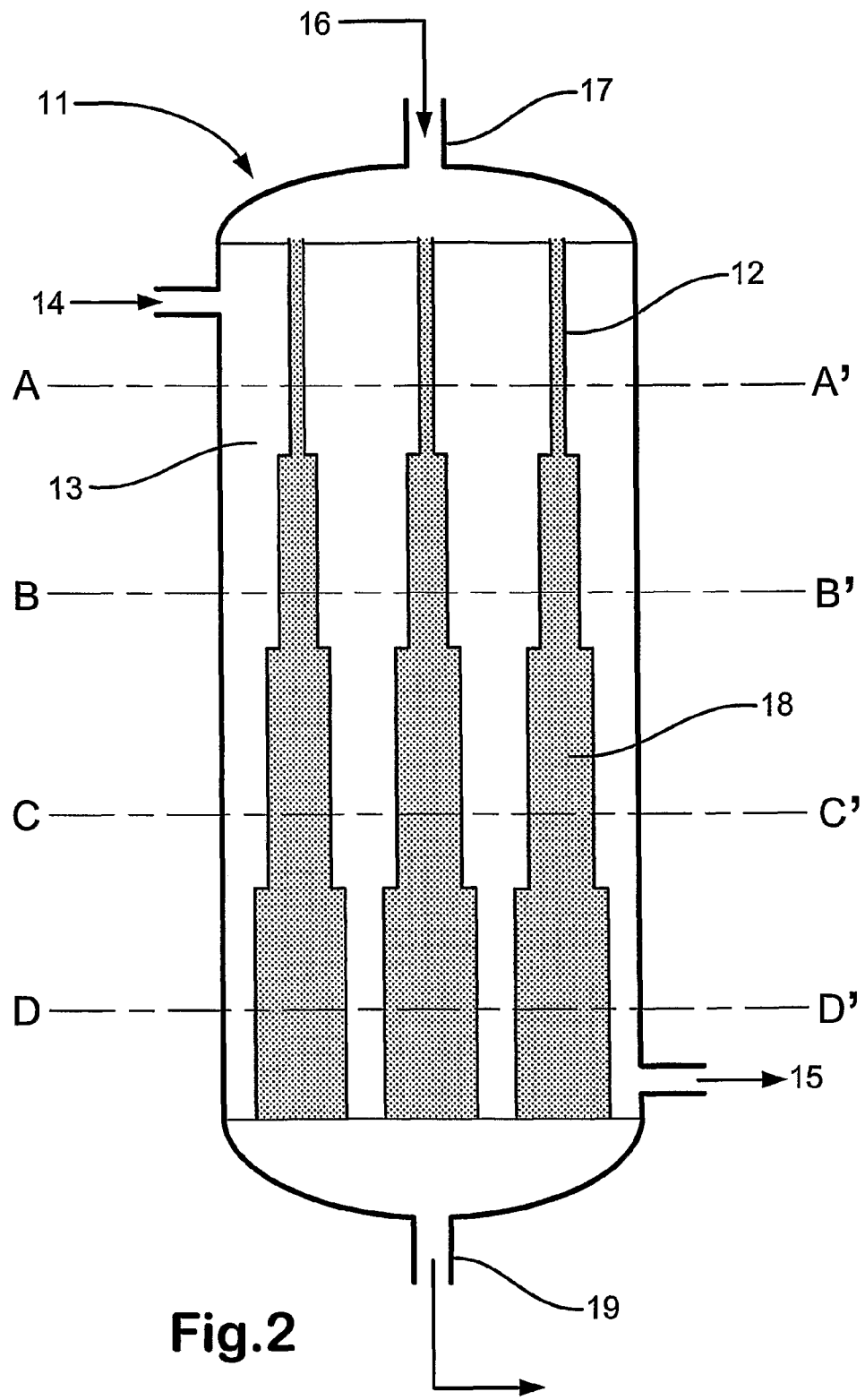
FIG. 2 is a schematic representation of a longitudinal section of a reactor according to the present invention comprising catalyst-filled inserts.

FIG. 2 shows a reactor 11 with a plurality of inserts 12 which contain particles of Fischer-Tropsch catalyst 18. Coolant is fed into the reactor space between the inserts 13 through inlet 14 and removed through outlet 15. Syngas 16 is fed into the catalyst-containing inserts through inlet 17, and contacted with the solid catalyst 18 within the inserts. Condensed-phase hydrocarbon products and unreacted reactants are removed from the catalyst-containing inserts through outlet 19. The diameter of the inserts progressively increases from the top of the solid catalyst beds, where the reactant gases first come into contact with the catalyst, to the bottom of the solid catalyst beds, forming discrete regions of the solid catalyst bed with different cross-sectional area. The volume of the solid catalyst beds increases with increased cross-sectional area.

Figure 3:
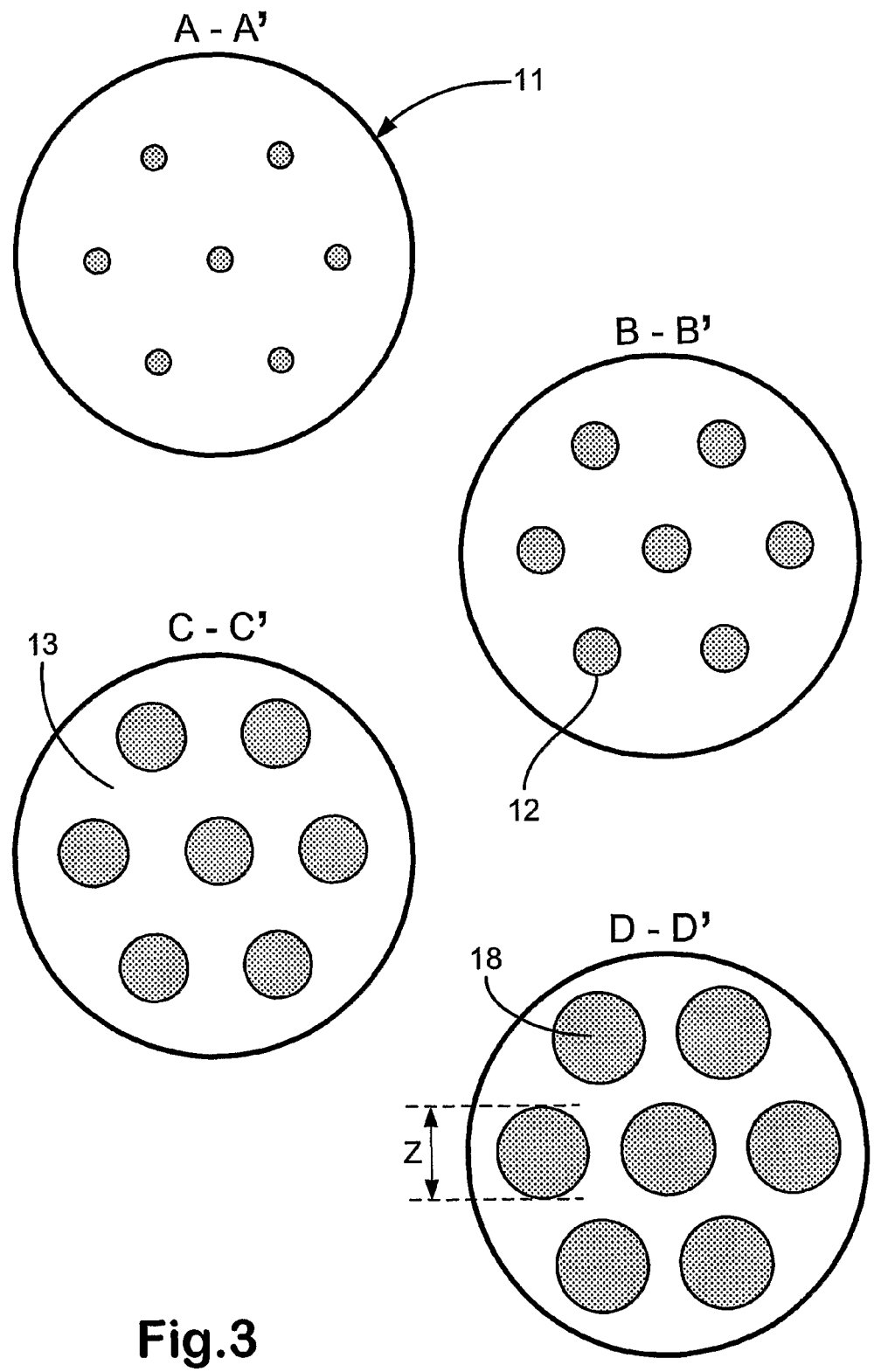
FIG. 3 shows a series of cross-sections through the reactor illustrated in FIG. 2.

FIG. 3 illustrates four cross-sections of the reactor 11 of FIG. 1, through planes A-A', B-B', C-C' and D-D'. The inserts 12, and the cross-sectional area of the solid catalyst beds 18 therein, have different diameters, Z, at different depths. The space 13 between the inserts is filled with coolant.

The invention claimed is:

1. A process for the production of a condensed-phase product from one or more gas-phase reactants, which process comprises feeding one or more reactants into a reactor, in which reactor the one or more reactants react in the gas-phase in the presence of a solid catalyst having one or more catalyst components to produce at least one product which is in a condensed-phase under reaction conditions, wherein the solid catalyst is present as a bed having two or more regions in which the contact time of the one or more gas-phase reactants with the one or more catalyst components is different.

2. A process as claimed in claim 1, in which each region of the solid catalyst bed has different concentrations of the one or more catalyst components.

3. A process as claimed in claim 1, in which the two or more regions of the solid catalyst bed have a different cross-sectional area and volume.

4. A process as claimed in claim 1, in which the solid catalyst comprises particles.

5. A process as claimed in claim 1, in which the solid catalyst comprises a support selected from the group consisting of silica, alumina, silica/alumina, titania, zirconia, ceria and zinc oxide.

6. A process as claimed in claim 1, in which at least one catalyst component is a metal active for Fischer-Tropsch synthesis selected from the group consisting of cobalt, iron, ruthenium, nickel, molydenum, tungsten, and rhenium.

7. A process as claimed in claim 1, in which syngas is a reactant, and the at least one condensed-phase product comprises a mixture of hydrocarbons that is liquid under the reaction conditions.

8. A process as claimed in claim 1, in which the reactor comprises one or more inserts.

9. A process as claimed in claim 8, in which the one or more inserts contain the solid catalyst and the space between the inserts is surrounded by a heat-transfer medium.

10. A process as claimed in claim 7, in which diesel or aviation fuel is produced from the mixture of hydrocarbons.

11. A process as claimed in claim 4, in which the particles are spheres, beads, granules or extrudates.

12. A process for the production of a condensed-phase product from one or more gas-phase reactants, which process comprises feeding one or more reactants into a reactor, in which reactor the one or more reactants react in the gas-phase in the presence of a solid catalyst having one or more catalyst components to produce at least one product which is in a condensed-phase under reaction conditions, wherein the solid catalyst comprises a shaped insert, a bed of fibrous materials or mesh, or a bed of solid particles, and has two or more regions in which the contact time of the one or more gas-phase reactants with the one or more catalyst components is different.

* * * * *